United States Patent
Koo et al.

(10) Patent No.: US 7,616,187 B2
(45) Date of Patent: Nov. 10, 2009

(54) THREE-DIMENSIONAL DISPLAY DEVICE AND METHOD USING HYBRID POSITION-TRACKING SYSTEM

(75) Inventors: Jae-phil Koo, Seoul (KR); Dae-sik Kim, Suwon-si (KR); Kyung-hoon Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 651 days.

(21) Appl. No.: 11/320,864

(22) Filed: Dec. 30, 2005

(65) Prior Publication Data

US 2006/0227103 A1 Oct. 12, 2006

(30) Foreign Application Priority Data

Apr. 8, 2005 (KR) .................. 10-2005-0029599

(51) Int. Cl.
G09G 5/00 (2006.01)
(52) U.S. Cl. .................. 345/156; 348/51; 348/59
(58) Field of Classification Search .................. 345/6, 345/156; 715/864; 348/51, 59
See application file for complete search history.

(56) References Cited

U.S. PATENT DOCUMENTS

| 6,847,351 | B2 * | 1/2005 | Noguera ............. 345/158 |
| 2002/0015007 | A1 | 2/2002 | Perlin et al. |
| 2003/0095155 | A1 * | 5/2003 | Johnson ............. 345/864 |
| 2003/0156146 | A1 * | 8/2003 | Suomela et al. ............. 345/864 |
| 2004/0105573 | A1 * | 6/2004 | Neumann et al. ............. 382/103 |
| 2005/0111737 | A1 * | 5/2005 | Das et al. ............. 382/190 |
| 2006/0072815 | A1 * | 4/2006 | Wu et al. ............. 382/167 |

FOREIGN PATENT DOCUMENTS

| EP | 1 379 063 A1 | 1/2004 |
| JP | 03-292093 A | 12/1991 |
| JP | 08-287291 A | 11/1996 |
| JP | 2002-010293 A | 1/2002 |
| JP | 2002-300610 A | 10/2002 |
| KR | 10-2001-0057718 A | 7/2001 |
| KR | 2001-0104017 A | 11/2001 |
| KR | 10-2004-0053997 A | 6/2004 |
| WO | WO 99/32960 A1 | 7/1999 |

* cited by examiner

*Primary Examiner*—Amare Mengistu
*Assistant Examiner*—Koosha Sharifi
(74) *Attorney, Agent, or Firm*—Sughrue Mion, PLLC

(57) ABSTRACT

A 3D display device and method using a hybrid position-tracking system is provided, along with a method for displaying the 3D image. The 3D display device includes a main body, a display, a camera, a first calculation part, a gyroscope, a second calculation part, and a Kalman filter. The display provides a 3D image and the first calculation part calculates a relative posture change of the display with respect to a viewing position on the basis of the image photographed by the camera. The gyroscope is mounted in the main body to sense a change in an angular velocity of the display. The second calculation part calculates a relative posture change of the display and the Kalman filter receives the calculation results obtained by the first and second calculation parts to calculate a corrected-posture-change amount of the display.

17 Claims, 15 Drawing Sheets

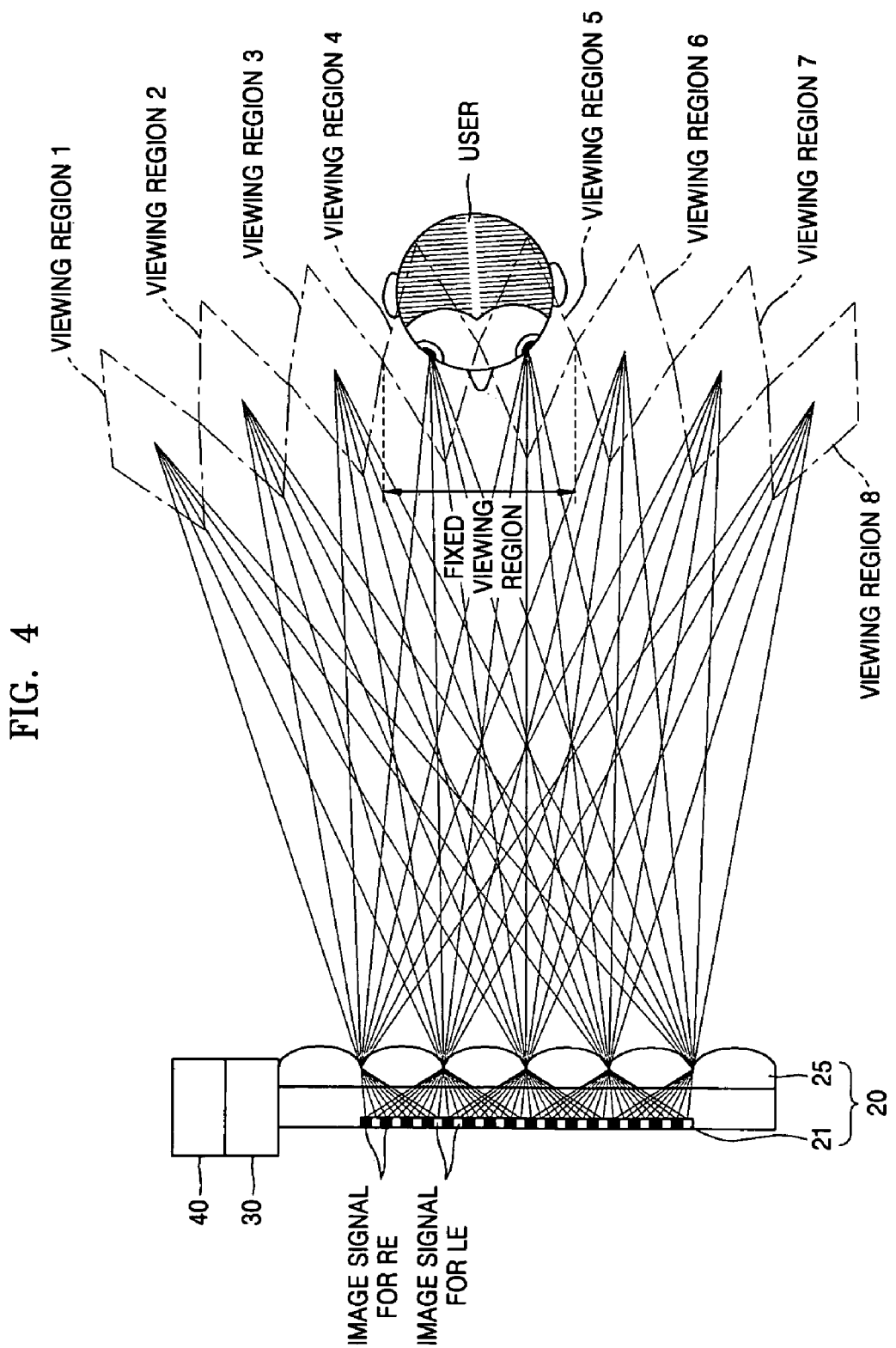

FIG. 12A
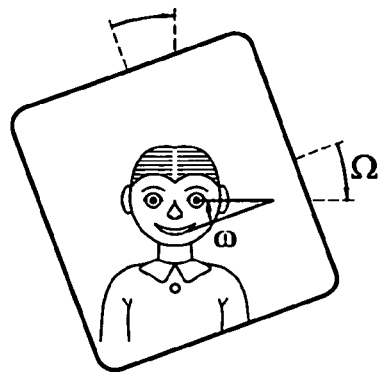
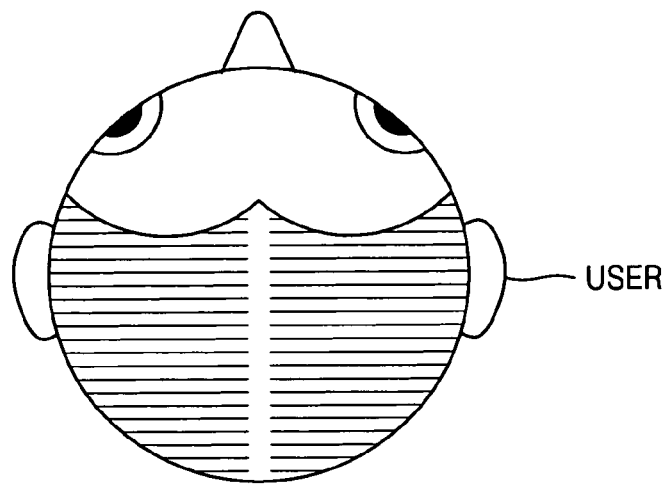
FIG. 12B
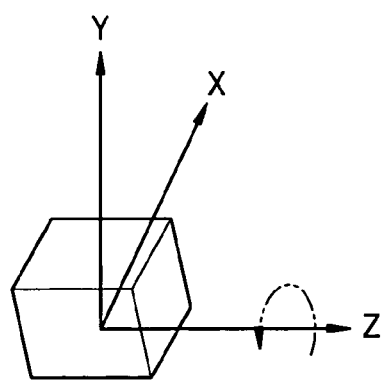

THREE-DIMENSIONAL DISPLAY DEVICE AND METHOD USING HYBRID POSITION-TRACKING SYSTEM

CROSS-REFERENCE TO RELATED PATENT APPLICATION

This application claims priority from Korean Patent Application No. 10-2005-0029599, filed on Apr. 8, 2005, in the Korean Intellectual Property Office, the disclosure of which is incorporated herein in its entirety by reference.

BACKGROUND OF THE INVENTION

1. Field of the Invention

The present invention relates to a three-dimensional (3D) display device and method using a hybrid position-tracking system, and more particularly, to a 3D display device and method using a hybrid position-tracking system capable of tracking a posture (orientation) change of a mobile display device providing a 3D image using a camera and a gyroscope.

2. Description of the Related Art

A 3D image display device is a device separating an image for a left eye (LE) and an image for a right eye (RE) having binocular parallax and providing the images to an LE and an RE of a user, respectively. Therefore, a user can view a 3D image by mentally combining an image of an LE and an image for an RE obtained through the retina of the two eyes of the user. The 3D image display device can be widely applied to a variety of fields requiring a 3D image such as medical treatment, game, advertisement, education, and military affairs.

Recently, as a high-quality high-definition television (HDTV) and mobile communication develop, development of a real-sense type mobile 3D display device is required. The mobile 3D display device can be embodied in cellular phones, personal digital assistants (PDAs), tablet computers, notebook computers, or portable televisions. The relative position of the mobile 3D display device can change with respect to the position of two eyes of a user in view of its characteristic. Therefore, a viewing-point tracking system tracking a viewing point and switching between an image signal for a left eye (LE) and an image signal for a right eye (RE) is required so as to prevent conversion between an image for an LE and an image for an RE.

FIG. 1 is a schematic view of a 3D display device using a viewing-point tracking system of a conventional art.

Referring to FIG. 1, the 3D display device 1 includes a screen 3 providing image signals for an RE and an LE, and a lenticular lens 5 disposed on the front of the screen 3 and separating viewing regions of the images resulted on the screen 3. The screen 3 includes a lenticular screen or a parallax barrier and separates provided image signals for an RE and an LE for each viewing region using the lenticular screen and the parallax barrier. The lenticular lens 5 separates, in a plurality of viewing points, the image signals for an LE and an RE separated by the screen 3 so that the image signals can be viewed at various positions.

Therefore, a 3D image provided from the screen 3 is viewing region-separated at the lenticular lens 5 and results in viewing regions 1 through 8. Here, the image signals for the RE are resulted on the viewing regions 1, 3, 5, and 7, and the image signals for the LE are resulted on the viewing regions 2, 4, 6, and 8.

Therefore, a user whose RE and LE are positioned in the viewing regions 1 and 2, the viewing regions 3 and 4, the viewing regions 5 and 6, and the viewing regions 7 and 8, respectively, can view a 3D image provided from the display device 1.

On the contrary, when an RE and an LE of a user are positioned in the viewing regions 2 and 3, the viewing regions 4 and 5, and the viewing regions 6 and 7, respectively, the user views the image signals for the LEs through the RE and view the image signals for the REs through the LE. That is, a user (USER 1) whose RE and LE are positioned in the viewing regions 5 and 1 respectively can view a normal 3D image properly. On the contrary, a user (USER 2) whose RE and LE are positioned in the viewing regions 4 and 5, respectively, views a 3D image whose right and left are mutually converted.

To prevent conversion of a 3D image, the 3D display device 1 includes a viewing-point tracker 7 capable of tracking an eye (e.g., a solid charge coupled device (CCD) camera or an infrared camera).

Therefore, in the case where an RE and an LE of a user are positioned in the viewing regions 5 and 6, a viewing point of a user is tracked by the viewing-point tracker 7 and image signals for an RE and image signals for an LE arranged as illustrated in FIG. 1 are provided without image-signal conversion. On the contrary, in the case where an RE and an LE of a user are positioned in the viewing regions 4 and 5, a viewing point of a user is tracked by the viewing-point tracker 7 and image signals for an RE and image signals for an LE are mutually converted and then provided to a user, so that conversion of a 3D image can be prevented.

In the case where the conventional art 3D display device adopts a CCD camera so as to track the position of a viewing point, there is a disadvantage that the CCD camera is very sensitive to light. Therefore, it is difficult to track the position of the viewing point of a user at night or in the dark inside. Also, in the case where the 3D display device adopts an infrared camera, there is a disadvantage that the infrared camera is sensitive to various light sources, other than pupils of a user. In that case, the tracking of the position of a viewing point might be disturbed due to sunlight, an infrared emitted from an incandescent electric lamp or a fluorescent lamp.

Also, the 3D display device using a CCD/infrared camera has a slow response speed compared with a tracking system of other kinds. Therefore, when rapid movement of a viewing point occurs, there is high possibility that the tracking of the viewing point fails. Use of a CCD camera having a high frame rate is required to overcome the above disadvantage, but in that case, manufacturing costs increase.

An inertia sensor such as a gyroscope, an acceleration meter, other than a camera can be adopted as the viewing-point tracker. In that case, the inertia sensor has a high frame rate and can track the position even when the viewing point moves fast. However, the inertia sensor has a low signal to noise ratio (SNR) for movement of no acceleration or slow movement, so that an error increases as time elapses.

SUMMARY OF THE INVENTION

The present invention provides a 3D display device using a hybrid position-tracking system that adopts both a camera and a gyroscope so as to track a posture change of a mobile information terminal more accurately.

According to an aspect of the present invention, there is provided a 3D display device including: a main body; a display providing a 3D image; a camera mounted in the main body and photographing a user; a first calculation part calculating a relative posture change of the display with respect to a viewing position on the basis of an image photographed by the camera; a gyroscope mounted in the main body and sensing a change in an angular velocity of the display; a second calculation part calculating a relative posture change of the display with respect to a viewing position on the basis of the change in the angular velocity sensed by the gyroscope; and a Kalman filter receiving the calculated posture-change amounts obtained by the first and second calculation parts and calculating a corrected posture-change amount of the display, when a relative position between a user and the display being changed, a user viewing an image signal for a left eye and an image signal for a right eye in viewing regions where a right eye and a left eye of the user are positioned, respectively, without conversion of the image signals.

The first calculation part may measure an interval (D=f*d1/d2) using trigonometry on the basis of an interval d1 between two eyes of a user calculated by Bayesian Classifier, an interval d2 between two eyes of a user on the display calculated through calibration of the camera, and a focal length 'f' of the camera, and the first calculation part may calculate a rotation amount of the display with respect to a viewing position on the basis of a displacement of a user photographed by the camera and displayed on the display.

The second calculation part may calculate a rotation amount of the display by integrating an angular velocity sensed by the gyroscope over a time axis.

BRIEF DESCRIPTION OF THE DRAWINGS

The above and other aspects of the present invention will become more apparent by describing in detail exemplary embodiments thereof with reference to the attached drawings in which:

FIG. 4 is a view illustrating an optical arrangement of a 3D display device according to an exemplary embodiment of the present invention;

FIGS. 12A and 12B are views illustrating the main body is rotated using a Z-axis for a rotational axis.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
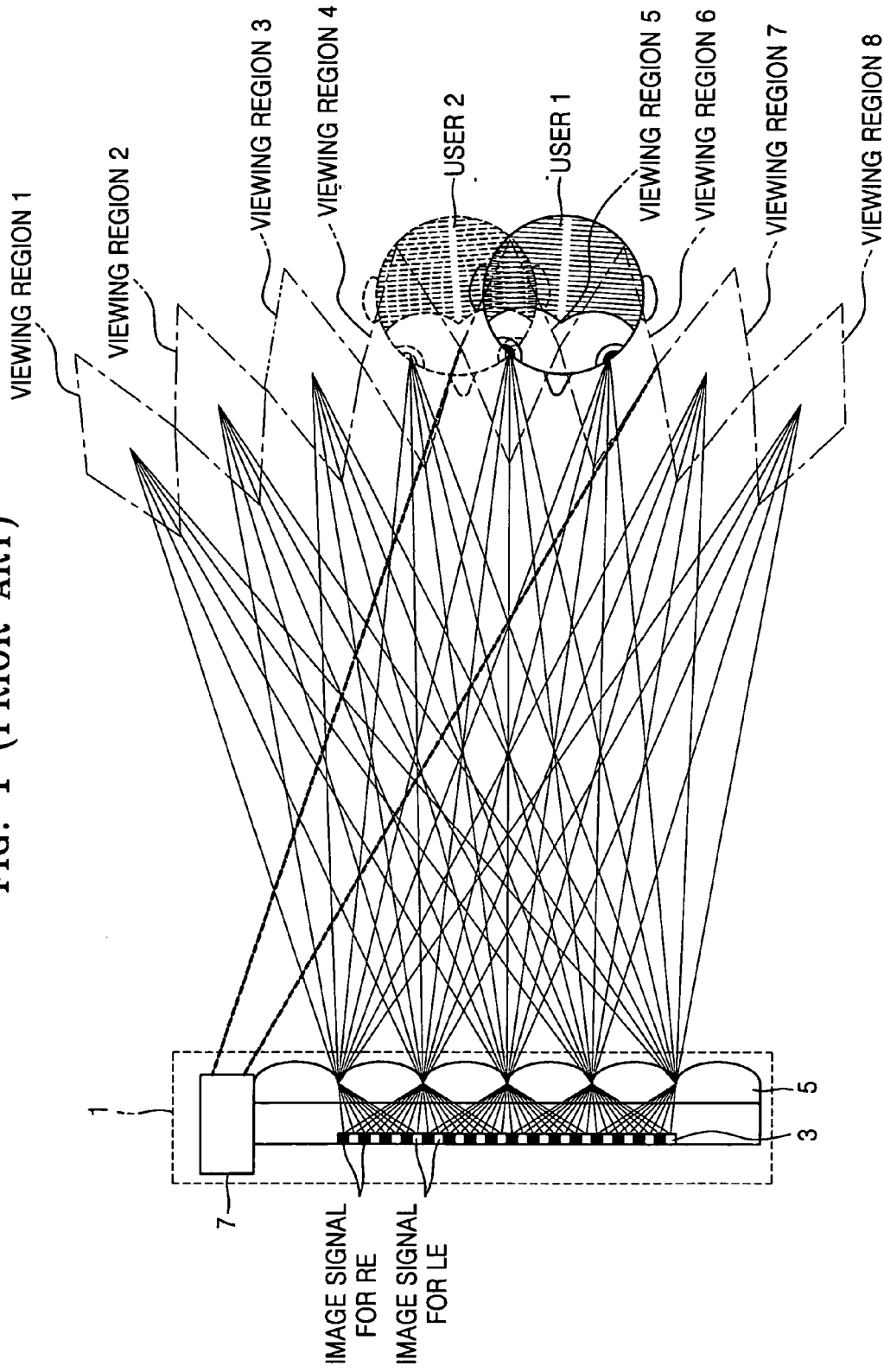
FIG. 1 is a schematic view of a 3D display device using a viewing-point tracking system of a conventional art.
Figure 2:
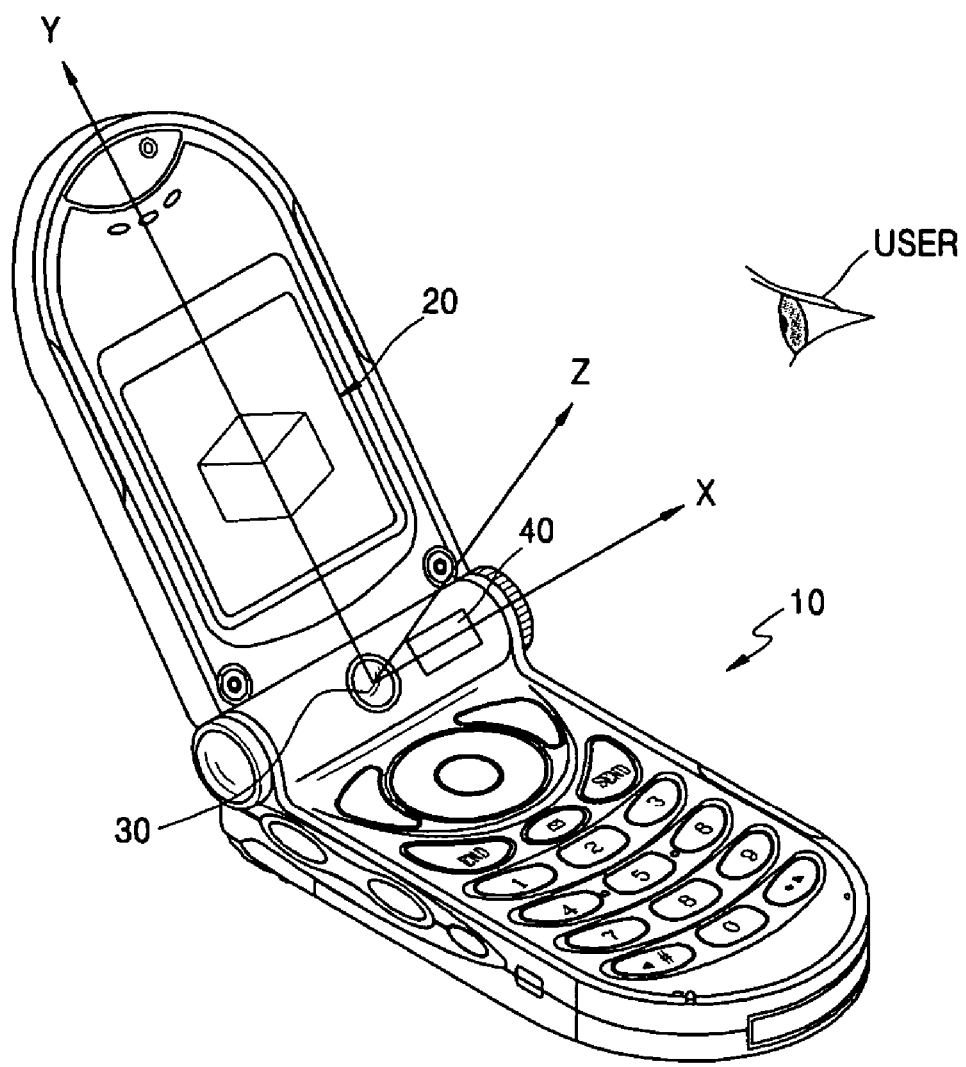
FIG. 2 is a perspective view of a 3D display device using a hybrid position-tracking system according to an exemplary embodiment of the present invention.
Figure 3:
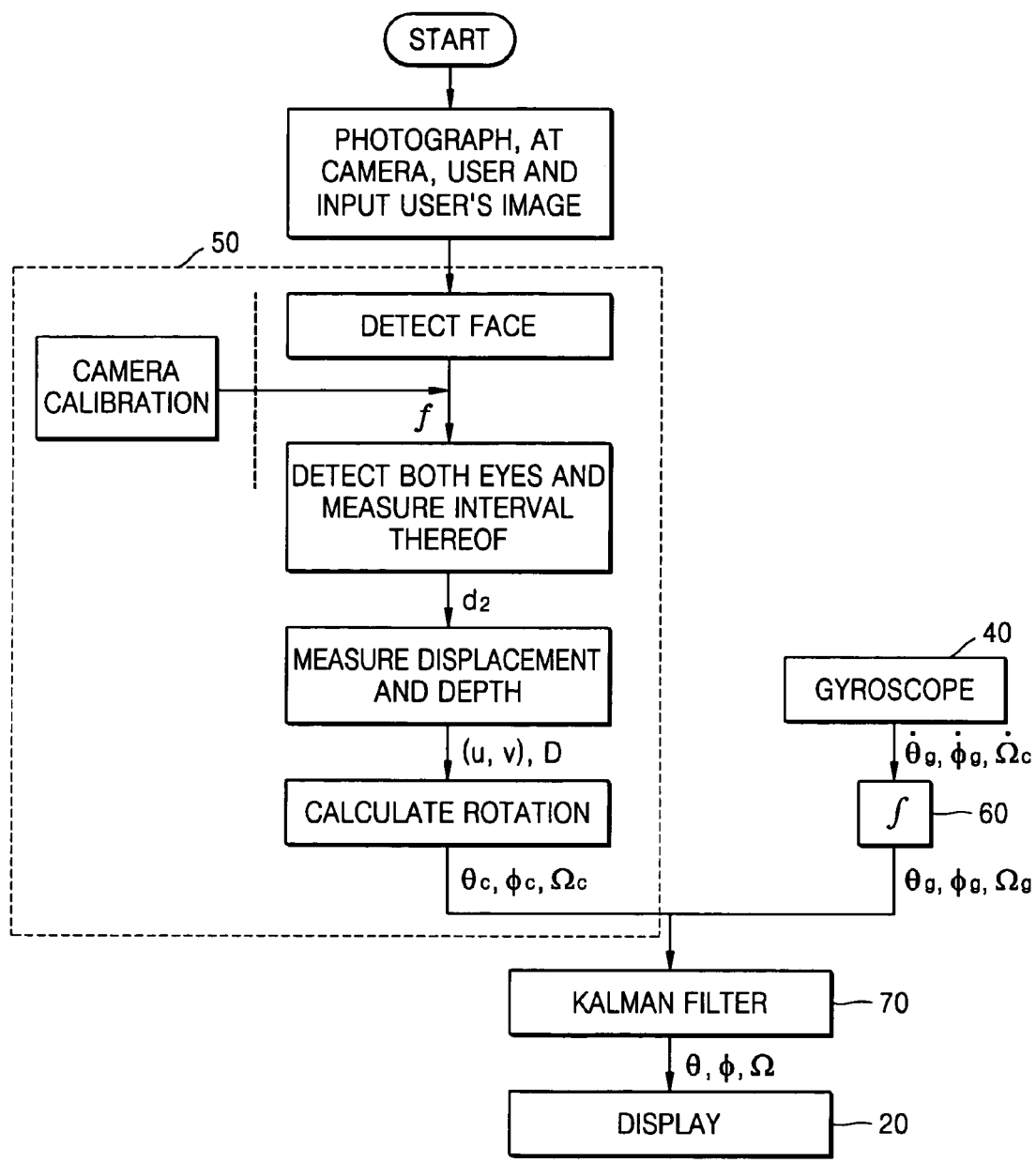
FIG. 3 is a block diagram of a 3D display device according to an exemplary embodiment of the present invention.

FIG. 2 is a perspective view of a 3D display device using a hybrid position-tracking system according to an exemplary embodiment of the present invention, FIG. 3 is a block diagram of a 3D display device according to an exemplary embodiment of the present invention, and FIG. 4 is a view illustrating an optical arrangement of a 3D display device according to an exemplary embodiment of the present invention.

Referring to FIGS. 2 through 4, the 3D display device according to an exemplary embodiment of the present invention includes: a main body 10; a display 20; a camera 30 and a gyroscope 40 mounted in the main body 10 to sense a posture of the display 20 with respect to a viewing position of a user (USER 1); first and second calculation parts 50 and 60 calculating a posture change using the sensed value; and a Kalman filter 70.

The main body 10 is a device providing a 3D image and is exemplified by a cellular phone in the present exemplary embodiment. The main body 10 is not limited to the cellular phone but can be a variety of mobile display devices (e.g., personal digital assistants (PDAs), tablet computers, notebook computers, and portable televisions).

The display 20 includes a screen 21 displaying a 3D image for an LE and a 3D image for an RE and a viewing-region separation part separating viewing regions of a 3D image displayed on the screen 21. As illustrated, the viewing-region separation part includes a lenticular lens 25 or a parallax barrier (not shown) disposed on the front of the screen 21 and separates viewing regions of a left-3D image and a right-3D image resulted on the screen 21. Since the construction of the display realizing a 3D image is well known in the art as described above, detailed description thereof will be omitted.

The camera 30 includes a charge coupled device (CCD) or an infrared camera. The camera 30 is mounted in an inside or on an outside of the main body 10 and collects basic information required for sensing a posture change of the display 20 and tracking a viewing point of a user.

Figure 5A:
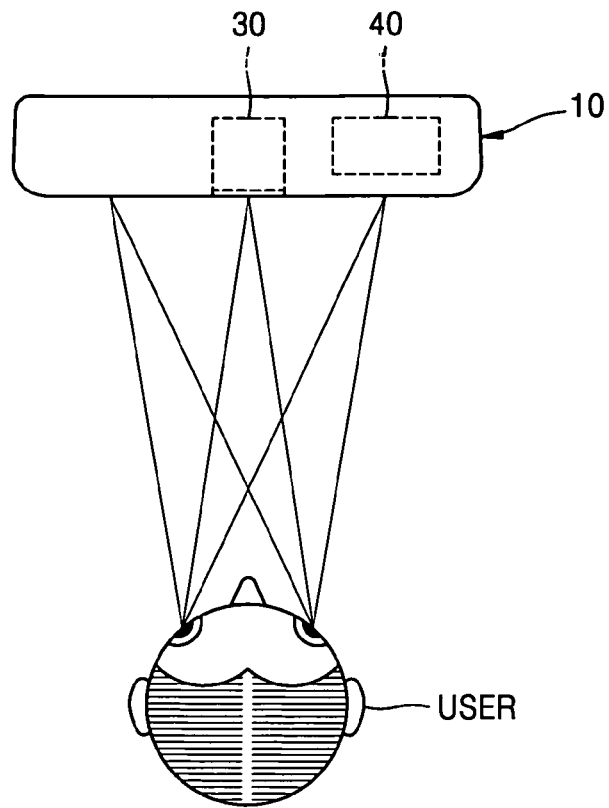
FIGS. 5A, 6A, and 7A are views illustrating a change of relative rotation positions with respect to a user's position in the 3D display device of FIG. 2.
Figure 5B:
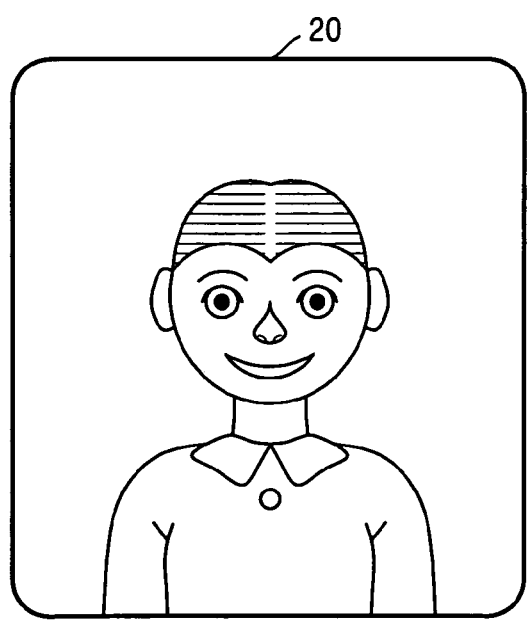
FIGS. 5B, 6B, and 7B are views illustrating a position of a user on a screen photographed by a camera of a 3D display device in cases of FIGS. 5A, 6A, and 7A, respectively.
Figure 6A:
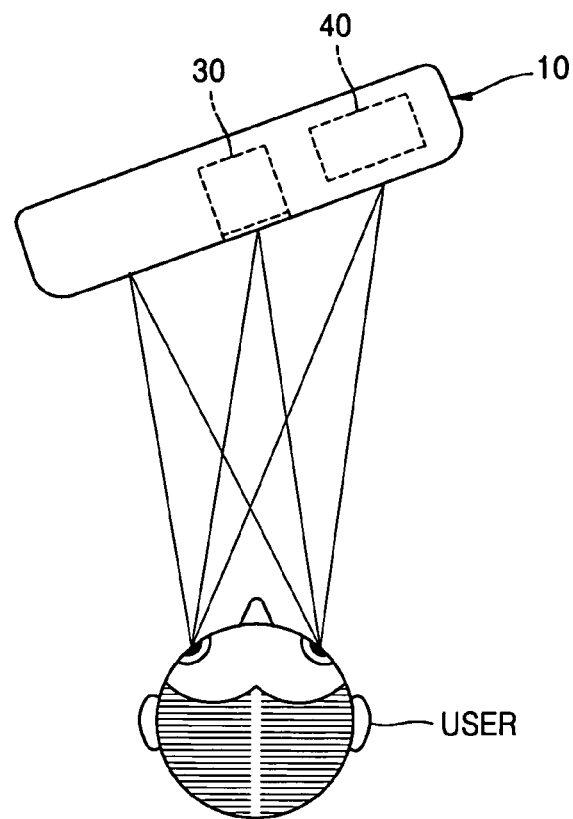
Figure 6B:
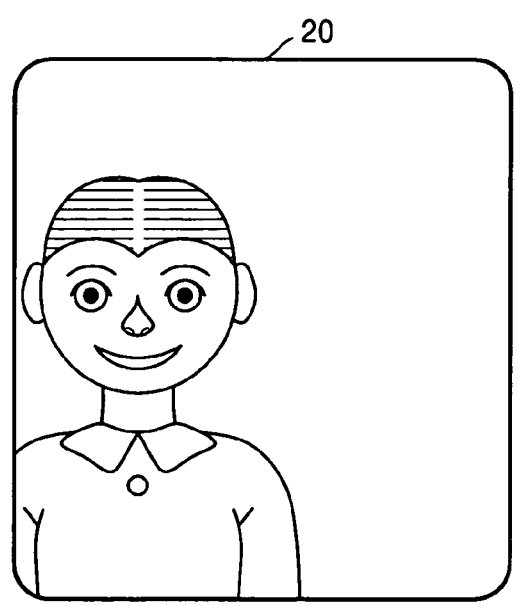
Figure 7A:
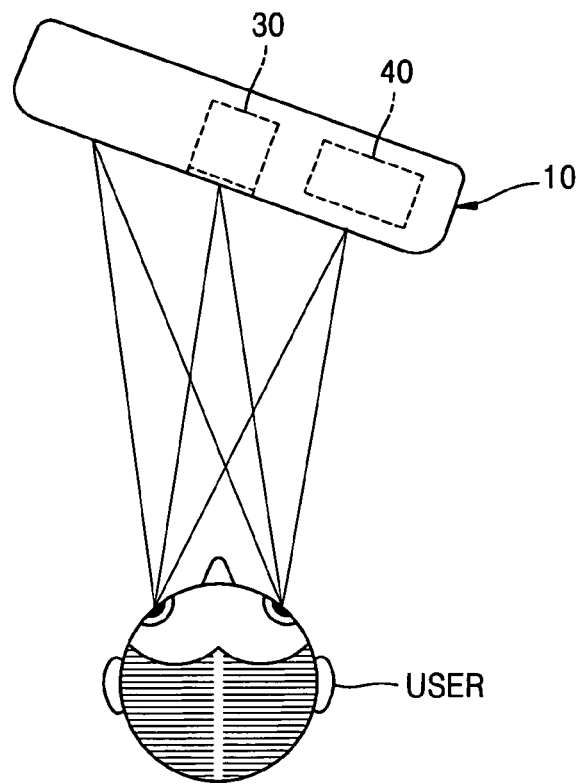
Figure 7B:
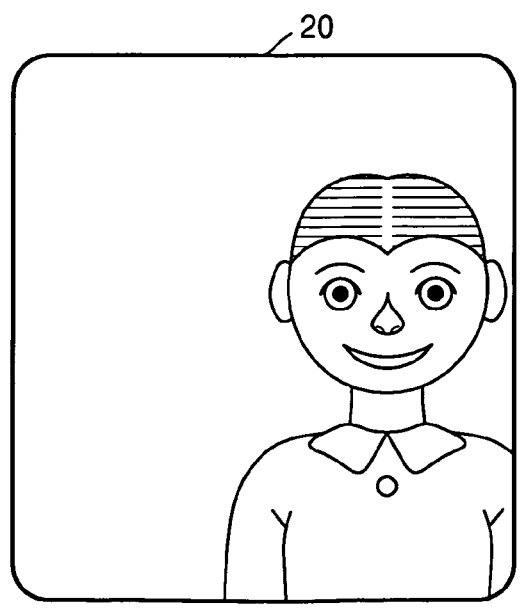

That is, the camera 30 can change its relative position from a user as illustrated in FIGS. 5A, 6A, and 7A when the user holds the main body 10 and takes a photograph of himself or herself. In that case, an image of the user displayed on the display 20 is shifted horizontally as illustrated in FIGS. 5B, 6B, and 7B.

Here, the position illustrated in FIG. 5A is the case where the position of an eye of a user is positioned at the center. In that case, a user can view a 3D image in the viewing regions 4 and 5 of FIG. 4. The position illustrated in FIG. 6A is the case where the main body 10 is rotated counterclockwise. In that case, a user can view a 3D image in the viewing regions 7 and 8 of FIG. 4. The position illustrated in FIG. 7A is the case where the main body 10 is rotated clockwise. In that case, a user can view a 3D image in the viewing regions 1 and 2 of FIG. 4.

Figure 8A:
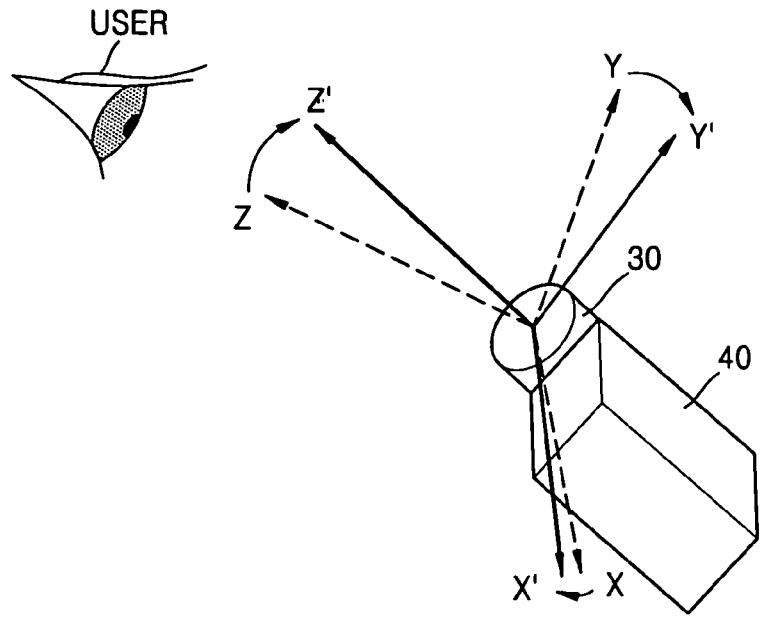
FIGS. 8A and 8B are schematic views illustrating the position of eyes on the display when the main body is rotated to an arbitrary coordinate (X', Y', Z') from a coordinate set to (0,0,0) in X, Y, and Z-axes.
Figure 8B:
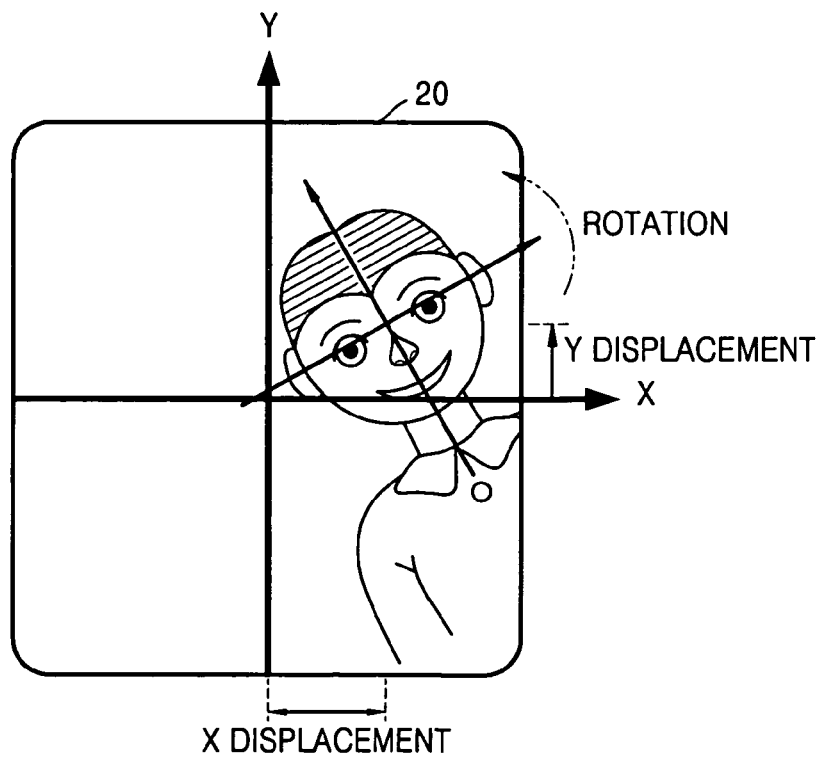
Figure 9:
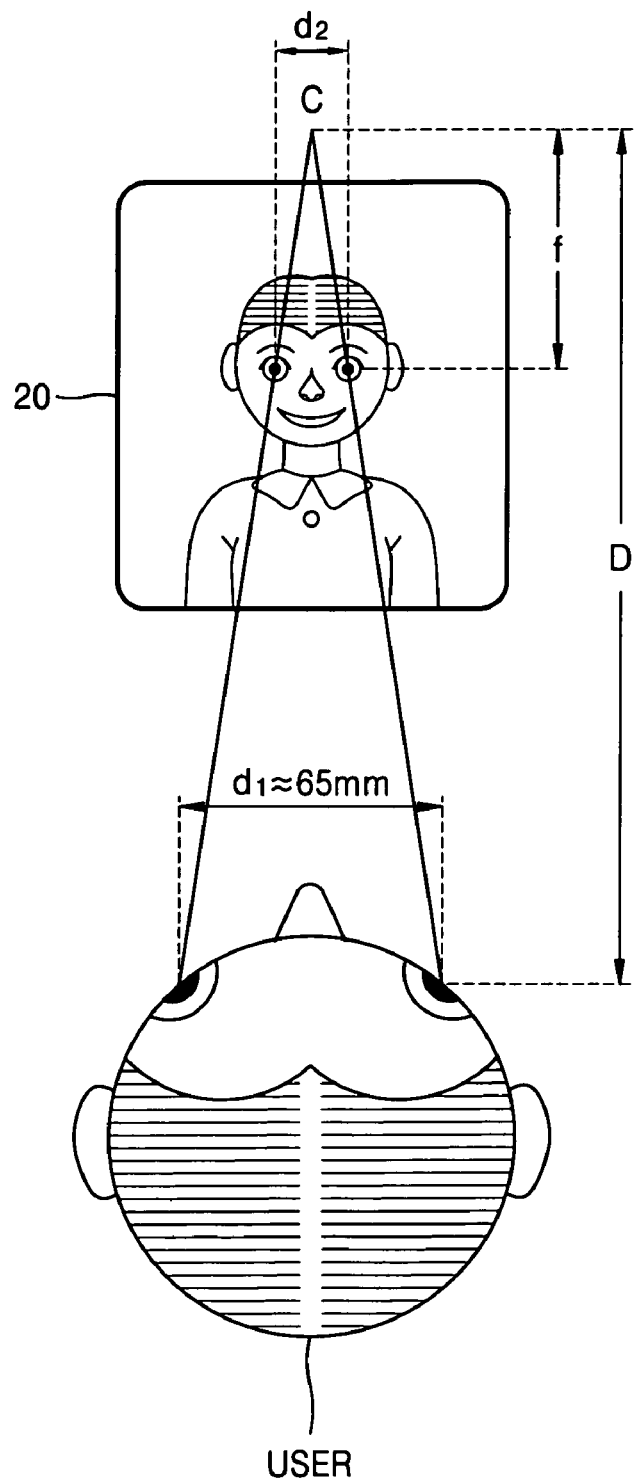
FIG. 9 is a view explaining a method of calculating an interval between a user and the display.

FIGS. 8A and 8B illustrate the position of eyes on the display when the main body is rotated to an arbitrary coordinate (X', Y', Z') from a coordinate set to (0,0,0) in X, Y, and Z-axes. In that case, the camera 30 can measure a rotation of the display 20 by measuring displacements of a user' eye in X and Y-axes and a rotation amount in an X-Y axis on a screen of the display 20. In that case, the gyroscope 40 measures a rotation amount (roll, yaw, pitch). The gyroscope 40 is mounted in an inside or on an outside of the main body 10 and senses a change of an angular velocity ($\dot{\theta}_g$, $\dot{\Phi}_g$, $\dot{\Omega}_g$) of the display 20 with respect to each axis and senses an image change.

The gyroscope 40 is a kind of an inertia sensor and senses a posture change of the display 20 in X, Y, and Z-axis directions. For example, in the case where a viewer (USER 1) holds the main body 10 in his hand and rotates the main body to right and left around Y-axis, the gyroscope 40 can sense a displacement of the display 20 with respect to an X-axis direction. The first calculation part 50 calculates a relative posture change of the display 20 with respect to a viewing position on the basis of an image photographed by the camera 30. Referring to FIGS. 3 through 9, the first calculation part 50 receives an image of a user photographed by the camera 30 to detect information of a user's face. Also, the first calculation part 50 measures an interval (D=f*d1/d2) between the display 20 and a user using trigonometry on the basis of an interval (d1≈65 mm) between two eyes of a user calculated by Bayesian Classifier, an interval 'd2' between two eyes of a user on the display 20 calculated through calibration of the camera, and a focal length f of the camera. Therefore, the viewing region appropriate for a user's viewing distance can be formed by controlling a barrier interval of the display 20 according to a difference of the interval D.

Also, the first calculation part 50 measures a displacement of an image of a user photographed by the camera 30 and calculates a rotation amount.

Figure 10A:
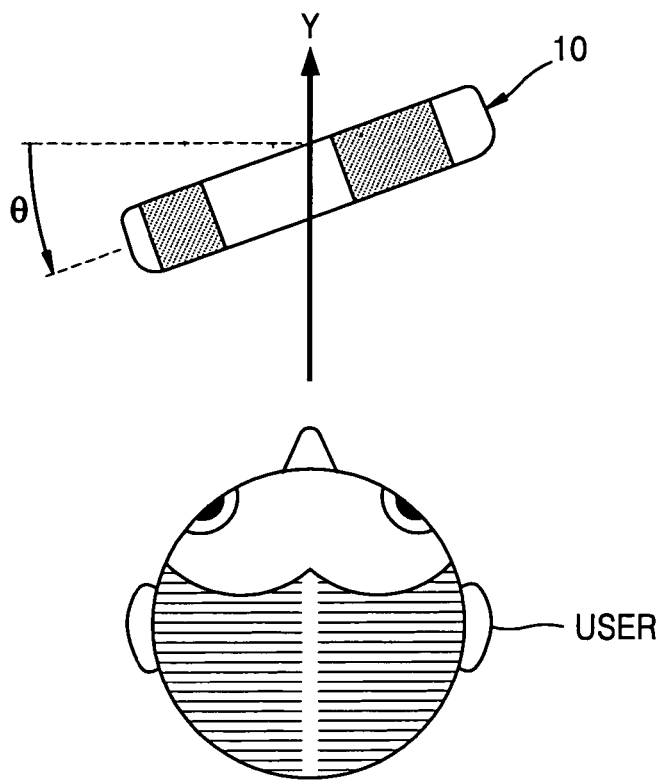
FIGS. 10A and 10B are views illustrating the main body that is rotated by an angle e in an X-axis direction using an Y-axis for a rotational axis with respect to a fixed position of a user.
Figure 10B:
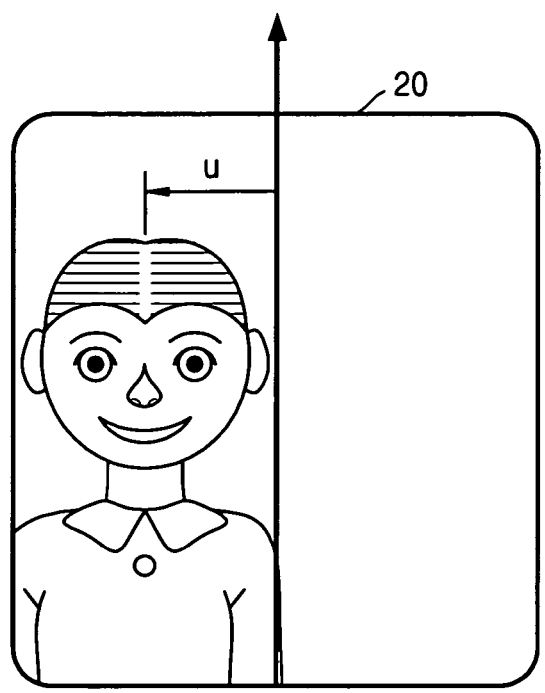
Figure 10C:
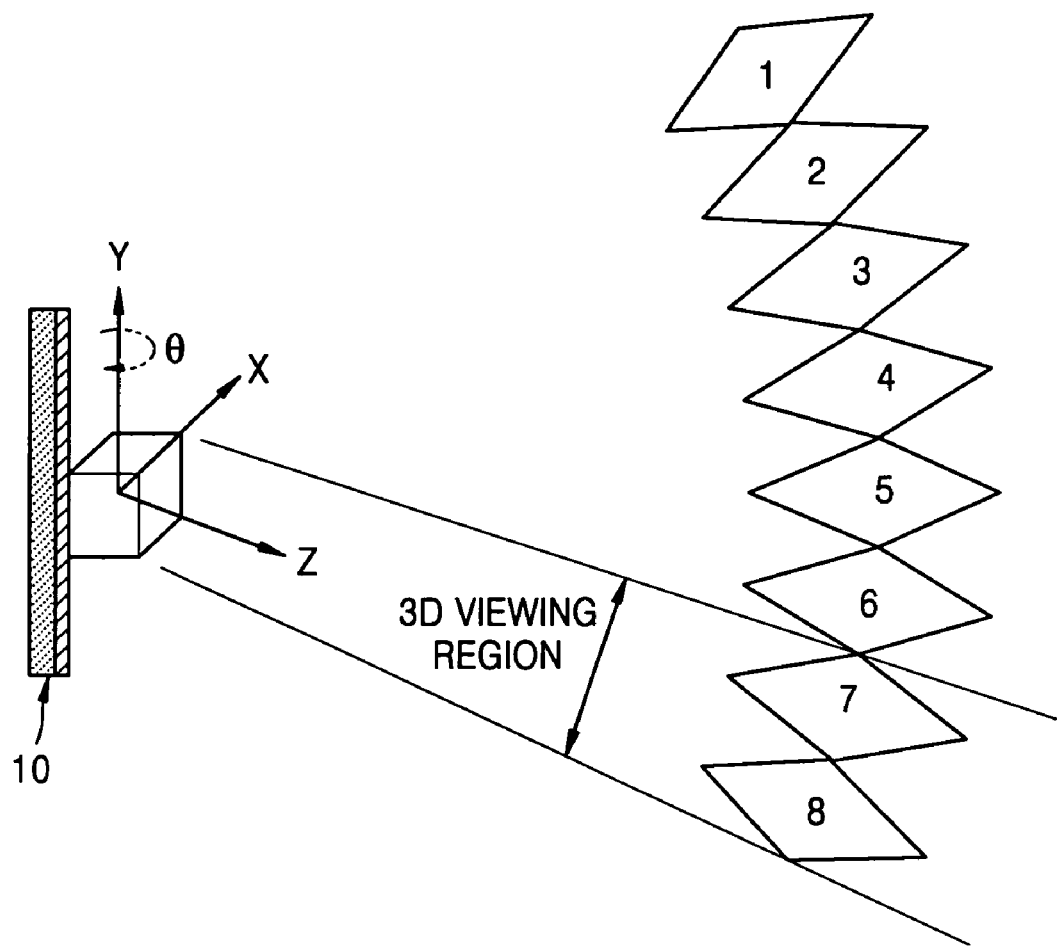
FIG. 10C is a view illustrating viewing regions formed in the case of FIGS. 10A and 10B.

FIGS. 10A through 10C exemplarily illustrate the main body 10 is rotated by an angle θ in an X-axis direction using a Y-axis for a rotational axis with respect to a fixed position of a user so that an image is displaced by an amount u to the upside of the display 20. In that case, two eyes of a user are positioned in the viewing regions 7 and 8, so that a user can view a 3D image provided from the display 20.

Figure 11A:
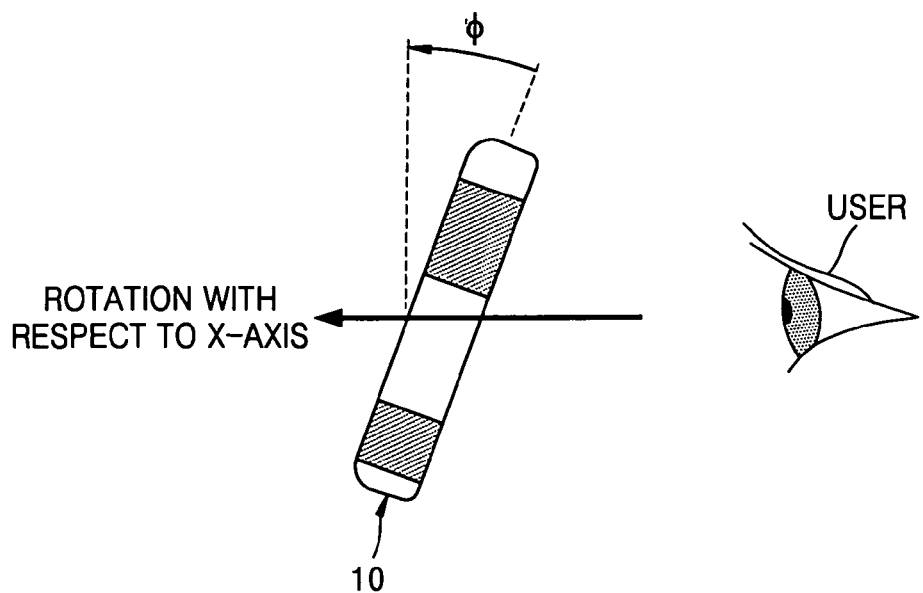
FIGS. 11A and 11B are views illustrating the main body that is rotated by an angle Φ in an Y-axis direction using an X-axis for a rotational axis with respect to a fixed position of a user.
Figure 11B:
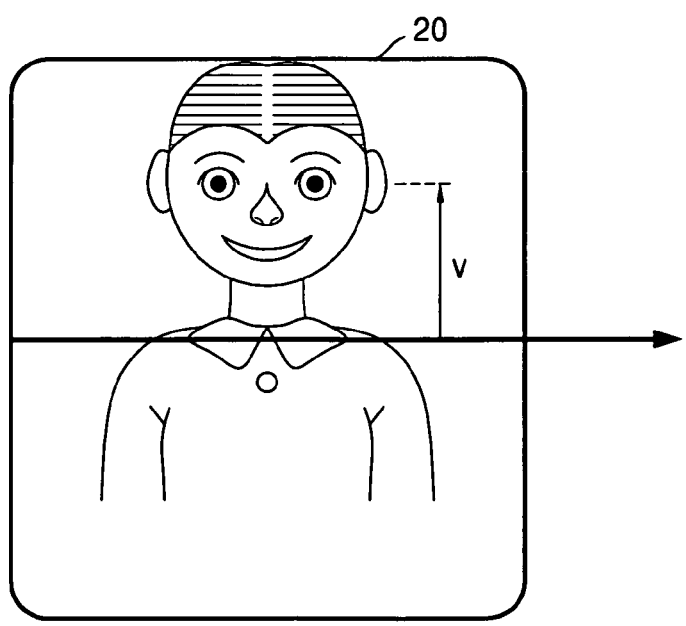
Figure 11C:
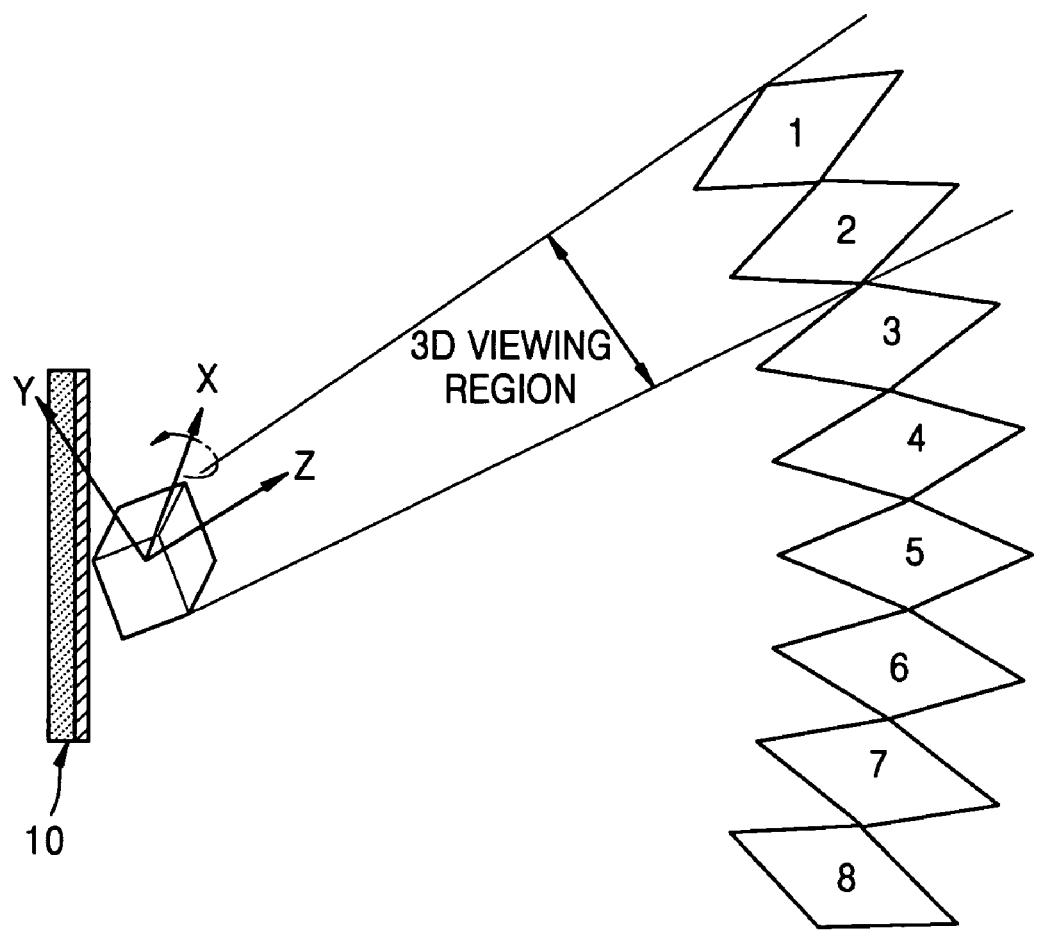
FIG. 11C is a view illustrating viewing regions formed in the case of FIGS. 11A and 11B.

FIGS. 11A through 11C exemplarily illustrate the main body 10 is rotated by an angle Φ in a Y-axis direction using an X-axis for a rotational axis with respect to a fixed position of a user so that an image is displaced by an amount v to the left of the display 20. In that case, two eyes of a user are positioned in the viewing regions 1 and 2 as illustrated in FIG. 11C.

Referring to FIGS. 10 and 11, when an image is displaced as much as values u, v, the first calculation part 50 detects a facial region and an eye of a user using an algorithm such as Bayesian Classifier to calculate an exact position of the u and the v. A rotation amount $\Phi_c$ (=α×u) of a camera and $\Phi_c$ (=β×v) can be obtained using a proportional expression by multiplying the calculated values u and v by proportional constants α and β obtained through an experiment, respectively. Here, a sampling period of the rotation amounts $\theta_c$ and $\Phi_c$ is about 12-30 Hz.

The second calculation part 60 calculates a posture change of the display 20 with respect to a viewing position on the basis of a change in an angular velocity sensed by the gyroscope 40. That is, the second calculation part 60 calculates rotation amounts $\theta_g$, $\Phi_g$, $\Omega_g$ of the display 20 by integrating the angular velocity sensed by the gyroscope 40 over a time axis. At this point, a sampling period of the display's rotation amount calculated by the second calculation part 60 is about 80-120 Hz, which is smaller than a sampling period of the rotation amount obtained by the camera 30.

The Kalman filter 70 calculates a corrected rotation amount of the display through sensor coupling of the camera 30 with the gyroscope 40. The Kalman filter 70 complements a disadvantage occurring because an error is generated more or less in measurement values of $\theta_c$, $\Phi_c$ and $\theta_g$, $\Phi_g$, and sampling periods are different. That is, in the case where the displacement of the main body 10 is slow, a rotation amount of the camera 30 calculated by the first calculation part 50 is exact when compared with a rotation amount of the camera 30 calculated by the second calculation part 60. On the contrary, in the case where the displacement of the main body 10 is fast, a rotation amount of the camera 30 calculated by the second calculation part 60 is exact when compared with a rotation amount of the camera 30 calculated by the first calculation part 50. Therefore, it is possible to obtain corrected rotation amounts (θ and Φ) for X and Y-axes and a short sampling period by performing hybrid tracking through a sensor coupling of the values calculated by the first and second calculation parts 50 and 60 in both cases.

The display 20 can generate the viewing regions appropriate for two eyes of a user according to the rotation amounts for X and Y-axes obtained above.

Figure 12C:
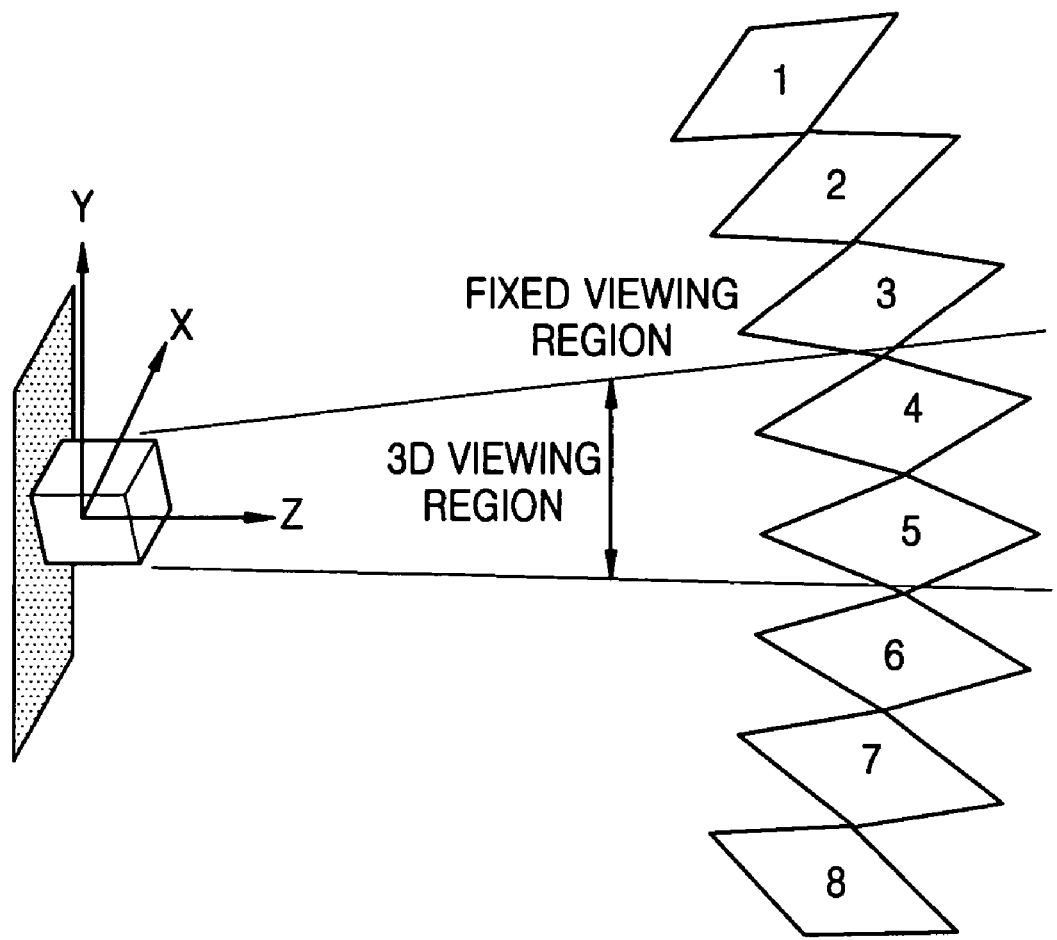
FIG. 12C is a view illustrating viewing regions formed in the case of FIGS. 12A and 12B.

FIGS. 12A through 12C exemplarily illustrate the case where the main body 10 is rotated using a Z-axis for a rotational axis with respect to a fixed position of a user. At this point, a rotation amount $\Omega_c$ (=γ×ω) of the camera can be obtained by measuring a rotation amount ω of a user's eye on the display 20. Here, γ is a proportional constant obtained by an experiment. In that case, a rotation amount $\Omega_g$ for a Z-axis is measured by the gyroscope 40 and the second calculation part 60.

At this point, a sampling period of $\Omega_g$ is short compared with a sampling period of $\Omega_c$ as in the rotation of the X and Y-axes. Such a difference can be corrected through a hybrid tracking using the Kalman filter 70 and a corrected rotation amount K can be obtained. It is possible to generate the viewing region appropriate for a user's viewing region on the basis of the corrected rotation amount Ω.

Referring to FIG. 3, in operation, lens information of the camera such as a focal length and a refractive index is obtained through calibration of the camera 30 on off-line.

The display 20 sets both coordinates (X, Y, Z) of the camera and the gyroscope to (0, 0, 0) when the face or the eyes of a user are positioned at the center of the screen.

The position of the face or the eyes of a user are detected on the display and the interval d2 between the two eyes is calculated using an algorithm of the Bayesian Classifier. After that, a relative rotation amount of a user is measured through transformation of the coordinate system of the camera with consideration of a relative movement between the display 20 and a user.

The displacement amounts u, v of the face or the eyes of a user with respect to the center of the display screen and ω are calculated, so that the rotation amounts $\theta_c$, $\Phi_c$, and $\Omega_c$ in the camera's coordinate system are obtained. At this point, the rotation amounts are calculated using the displacement amounts of the face or the eyes of a user, the interval between both eyes, and a focal length of the camera's lens.

Simultaneously, the rotation amounts $\theta_g$, $\Phi_g$, $\Omega_g$ for the respective axes are obtained by integrating the angular velocities of the respective axes obtained by the gyroscope 40 over a time axis.

As described above, the rotation amount obtained by the camera and the rotation amount obtained by the gyroscope are different from each other in their sampling periods and tracked rotation amounts. The Kalman filter 70 can correct the rotation amount and obtain a stable tracking result even when the rotation operation is performed fast by correcting the difference between the camera and the gyroscope through the sensor coupling. Therefore, it is possible to form the viewing region appropriate for a user on the basis of the above-obtained result.

The 3D display device using the hybrid position-tracking system can correct the relative rotation amount of the display with respect to a user detected by the camera and the gyroscope using the Kalman filter.

Therefore, a 3D display device having a stable and improved performance compared with the conventional 3D display device that uses one sensor or one camera can be realized. According to the present invention, a more accurate rotation amount can be obtained even when the display moves in a fast speed as well as when the display moves in a slow speed.

Therefore, the viewing region appropriate for a user positioned in a viewing position can be secured, so that a user can view a 3D image over a wide viewing region. Also, it is possible to prevent an image for an LE and an image for an RE from being provided to an RE and an LE of a user, respectively, by tracking an LE and an RE of a user using the position-tracking system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A three-dimensional (3D) display device comprising:
a main body;
a display which displays a 3D image;
a camera which is mounted in the main body;
a gyroscope which is mounted in the main body and senses a change in an angular velocity of the display;
a calculation unit which calculates a first relative posture change amount of the display with respect to a viewing position based on an image of a user photographed by the camera and calculates a second relative posture change amount of the display with respect to the viewing position based on the change in the angular velocity sensed by the gyroscope; and
a Kalman filter which receives the first and second relative posture change amounts calculated by the calculation unit and calculates a corrected posture change amount of the display,
wherein when a relative position between the user and the display is changed, a user is able to view an image signal for a left eye and an image signal for a right eye in viewing regions where a right eye and a left eye of the user are positioned, respectively, without conversion of the image signal for the left eye to the image signal for the right eye, and the image signal for the right eye to the image signal for the left eye.

2. The 3D display device of claim 1, wherein the calculation unit comprises a first calculation part which calculates the first relative posture change amount and a second calculation part which calculates the second relative posture change amount.

3. The 3D display device of claim 2, wherein the first calculation part measures an interval ($D=f*d1/d2$) between the display and the user using trigonometry on the basis of an interval d1 between the left and right eyes of the user calculated by Bayesian Classifier, an interval d2 between the left and right eyes of the user on the display calculated through calibration of the camera, and a focal length f of the camera, and the first calculation part calculates a rotation amount of the display with respect to the viewing position on the basis of a displacement of the user photographed by the camera and displayed on the display.

4. The 3D display device of claim 3, wherein a sample period of the rotation amount of the display calculated by the first calculation part is approximately 12 through 30 Hz.

5. The 3D display device of claim 2, wherein the second calculation part calculates a rotation amount of the display by integrating the angular velocity sensed by the gyroscope over a time axis.

6. The 3D display device of claim 3, wherein the second calculation part calculates a rotation amount of the display by integrating the angular velocity sensed by the gyroscope over a time axis.

7. The 3D display device of claim 2, wherein a sample period of a rotation amount of the display calculated by the second calculation part is approximately 80 through 120 Hz.

8. The 3D display device of claim 1, wherein the Kalman filter calculates a corrected rotation amount of the display through a sensor coupling of the camera with the gyroscope.

9. The 3D display device of claim 1, wherein the camera and the gyroscope are mounted in an inside or on an outside of the display.

10. The 3D display device of claim 1, wherein the display is a portable mobile display.

11. A method for displaying a three-dimensional (3D) image, the method comprising:
calculating a first posture change amount of a display of a 3D display device with respect to a viewing position based on an image of a user photographed by a camera of the 3D display device;
calculating a second posture change amount of the display with respect to the viewing position based on a change in an angular velocity of the display sensed by a gyroscope of the 3D display device;
calculating a corrected posture change amount of the display in a Kalman filter of the 3D display device based upon the first and second relative posture amounts which are calculated;
wherein when a relative position between a user and the display is changed, a user is able to view an image signal for a left eye and an image signal for a right eye in viewing regions where a right eye and a left eye of the user are positioned, respectively, without conversion of the image signal for the left eye to the image signal for the right eye, and the image signal for the right eye to the image signal for the left eye.

12. The method for displaying the 3D image of claim 11, wherein the calculating of the first posture change amount comprises measuring an interval ($D=f*d1/d2$) between the display and the user using trigonometry on the basis of an interval d1 between the left and right eyes of the user calculated by Bayesian Classifier, an interval d2 between the left and right eyes of the user on the display calculated through calibration of the camera, and a focal length f of the camera, and calculating a rotation amount of the display with respect to the viewing position on the basis of a displacement of the user photographed by the camera and displayed on the display.

13. The method for displaying the 3D image of claim 12, wherein a sample period of the rotation amount of the display is approximately 12 through 30 Hz.

14. The method for displaying the 3D image of claim 11, wherein the calculating of the second posture change amount comprises calculating a rotation amount of the display by integrating the angular velocity sensed by the gyroscope over a time axis.

15. The method for displaying the 3D image of claim 14, wherein a sample period of the rotation amount of the display is approximately 80 through 120 Hz.

16. The method for displaying the 3D image of claim 11, wherein the Kalman filter calculates a corrected rotation amount of the display through a sensor coupling of the camera with the gyroscope.

17. The method for displaying the 3D image of claim 11, wherein the camera and the gyroscope are mounted in an inside or on an outside of the display.

* * * * *

UNITED STATES PATENT AND TRADEMARK OFFICE
CERTIFICATE OF CORRECTION

| | | |
|---|---|---|
| PATENT NO. | : 7,616,187 B2 | Page 1 of 1 |
| APPLICATION NO. | : 11/320864 | |
| DATED | : November 10, 2009 | |
| INVENTOR(S) | : Koo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this

Nineteenth Day of October, 2010

David J. Kappos
*Director of the United States Patent and Trademark Office*